(12) United States Patent
Faraldo, II (10) Patent No.: US 7,409,403 B1
(45) Date of Patent: Aug. 5, 2008

(54) ALERT MANAGEMENT DATA INFRASTRUCTURE AND CONFIGURATION GENERATOR

(75) Inventor: David D. Faraldo, II, Foster City, CA (US)

(73) Assignee: Red Hat, Inc., Raleigh, NC (US)

( * ) Notice: Subject to any disclaimer, the term of this patent is extended or adjusted under 35 U.S.C. 154(b) by 366 days.

(21) Appl. No.: 10/020,123

(22) Filed: Oct. 30, 2001

(51) Int. Cl.
    *G06F 17/30* (2006.01)
(52) U.S. Cl. ..................................... 707/102
(58) Field of Classification Search .............. 707/1, 707/10, 102, 3, 5, 200, 2; 705/8, 14, 10; 709/217, 223, 224, 227, 216; 713/200, 201; 715/513; 348/478; 718/1
See application file for complete search history.

(56) References Cited

U.S. PATENT DOCUMENTS

| | | | | |
|---|---|---|---|---|
| 4,837,798 | A * | 6/1989 | Cohen et al. | 379/88.14 |
| 5,968,124 | A * | 10/1999 | Takahashi et al. | 709/224 |
| 6,012,088 | A * | 1/2000 | Li et al. | 709/219 |
| 6,219,648 | B1 * | 4/2001 | Jones et al. | 705/8 |
| 6,266,661 | B1 * | 7/2001 | Lewish et al. | 707/3 |
| 6,286,035 | B1 * | 9/2001 | Gillis et al. | 709/206 |
| 6,288,688 | B1 * | 9/2001 | Hughes et al. | 345/2.2 |
| 6,327,628 | B1 * | 12/2001 | Anuff et al. | 719/311 |
| 6,442,547 | B1 * | 8/2002 | Bowman-Amuah | 707/10 |
| 6,519,642 | B1 * | 2/2003 | Olsen et al. | 709/227 |
| 6,542,595 | B1 * | 4/2003 | Hemzal | 379/201.03 |
| 6,587,882 | B1 * | 7/2003 | Inoue et al. | 709/227 |
| 6,704,737 | B1 * | 3/2004 | Nixon et al. | 707/101 |
| 6,883,170 | B1 * | 4/2005 | Garcia | 718/1 |
| 7,069,309 | B1 * | 6/2006 | Dodrill et al. | 709/219 |
| 7,127,535 | B1 * | 10/2006 | Huebsch et al. | 710/52 |
| 7,145,898 | B1 * | 12/2006 | Elliott | 370/352 |
| 2002/0010618 | A1 * | 1/2002 | Pellegrinelli et al. | 705/10 |
| 2002/0052941 | A1 * | 5/2002 | Patterson | 709/223 |
| 2002/0064149 | A1 * | 5/2002 | Elliott et al. | 370/352 |
| 2002/0071442 | A1 * | 6/2002 | Li | 370/432 |
| 2002/0112021 | A1 * | 8/2002 | Detlef | 709/216 |
| 2002/0178246 | A1 * | 11/2002 | Mayer | 709/223 |
| 2002/0178380 | A1 * | 11/2002 | Wolf et al. | 713/201 |
| 2003/0020750 | A1 * | 1/2003 | Brown et al. | 345/752 |

OTHER PUBLICATIONS

TelAlert UMS 5.2 Quick Start Guide, Copyright 2000, Telamon, Inc. 220 pgs.
*TelAlert* Datasheet, Telamon, Inc., Oakland, CA., Jun. 16, 1999, 2 pages.
TelAlert UMS 5.2 Keyword and Command Reference, Copyright 2001 Telamon, Inc. 32 pgs.
TelAlert UMS 5.2 TelAdmin User Guide, Copyright 2001 Telamon, Inc. 238 pgs.
TelAlert UMS 5.2 Administrator Guide, Copyright 2001 Telamon, Inc. 138 pgs.

* cited by examiner

*Primary Examiner*—Etienne P LeRoux
(74) *Attorney, Agent, or Firm*—Blakely, Sokoloff, Taylor & Zafman LLP (57) ABSTRACT

A method and apparatus is described for the generation of an alert configuration file. According to one embodiment, configuration information is stored in a relational database which a configuration generator uses to generate a text configuration file. The configuration information being stored in the relational database allows for access control and data validation. At periodic intervals, the text configuration file is compiled to reinitialize an alerts serve with the updated configuration information.

51 Claims, 7 Drawing Sheets

ALERT MANAGEMENT DATA INFRASTRUCTURE AND CONFIGURATION GENERATOR

BACKGROUND OF THE INVENTION

1. Field of the Invention

The invention relates to the field of network systems. More specifically, the invention relates to the generation of an alert configuration file.

2. Background of the Invention

The TelAlert program available from Telamon of Oakland, Calif. provide individuals the capability to transmit messages to remote destinations over various telecommunication delivery mechanisms. In one prior art technique, TelAlert is used by business enterprises to transmit alert messages to a multitude of remote destinations. Here, TelAlert transmits alert messages generated by monitoring management, help desk, and/or dispatch applications to the responsible enterprise support staff. For example, a network help desk may use TelAlert to dispatch an alert message to the pager of a network technician, indicating perhaps, that a specific router is inaccessible on the network. TelAlert may transmit alert messages by way of a number of telecommunication delivery mechanisms including pagers, telephones, email, loudspeakers, signboards, among other examples.

Configuration Methods

Figure 1A:
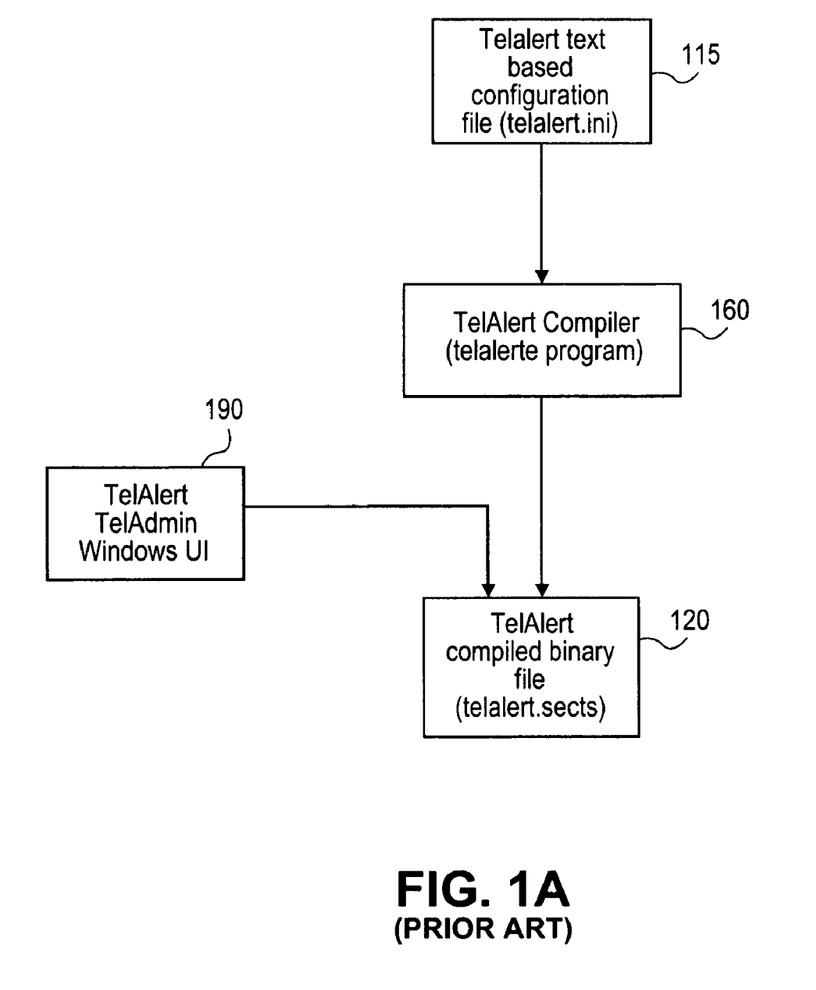
FIG. 1A illustrates a block diagram of a manner in which a TelAlert system is configured in the prior art.

FIG. 1A illustrates a block diagram of a manner in which a TelAlert system is configured in the prior art. The TelAlert system is configured by way of two configuration methods. The first configuration method is where a TelAlert configuration file 115 (called a TelAlert.ini 115 file) is edited directly, using a text editor. The other configuration method uses the TelAdmin application 190, also available from Telamon of Oakland, Calif.

The telalert.ini 115 file stores configuration information defined by sections, definitions, and keywords, as will be further described below. Traditionally, the TelAlert system is configured by opening the telalert.ini 115 file in a text editor, typing the necessary configuration changes in the appropriate locations (e.g., sections), and then saving the telalert.ini file. The telalert.ini 115 file is then compiled into the telalert.sect 120 file to be used by the Telalert system to transmit alert messages, as will be further described below.

When editing the telalert.ini 115 file, configuration information may be entered and modified in more or less any order, since doing so is simply a matter of typing and initializing. However, one problem with editing the telalert.ini 115 file is that there is no way to perform validation checks to ensure the configuration information is valid. Errors in modification of keywords and relationships will not be discovered until the compilation of the telalert.sects 120 file is performed, thereby, compromising the integrity of the TelAlert system. For example, editing the telalert.ini 115 file does not allow for referential integrity checks (e.g., must define X before referencing to X), value validation checks (e.g., protect against placing a character type in a number type field), typographical error checking, nor provide enforcement of general TelAlert system limitations (e.g., enforce maximum message size to be less than or equal to 1920 characters, among other examples). Therefore, in some cases, inconsistency in the configuration information may not be discovered until after an alert message fails to alert the necessary support staff and thereby delaying its resolution.

In contrast, the TelAdmin application 190 allows an alternative configuration method to provide configuration information to the TelAlert system. Here, the TelAdmin application 190 is used to perform configuration modifications to the telalert.sects 120 file directly. The TelAdmin application 190 is a Microsoft Windows-based graphical configuration tool. Although the TelAdmin application 190 runs only on a Microsoft Windows NT platform, it may be used to configure TelAlert installations running on UNIX operating system based platforms.

Figure 2:
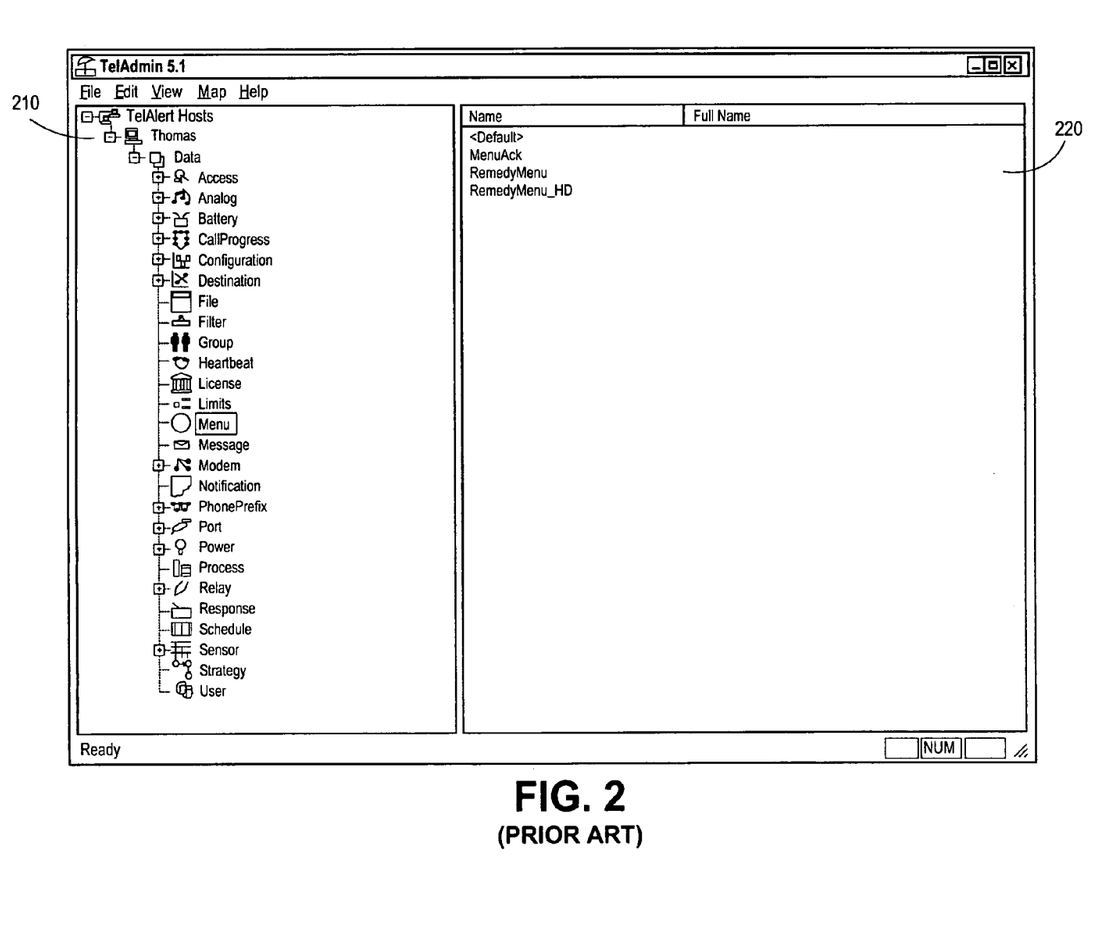
FIG. 2 illustrates a view of the TelAdmin application user interface in the prior art.

The TelAdmin application 190 is not a simple graphical configuration-file editor, but rather a front end for a multiuser transactional database system. In this way, the TelAdmin application 190 is similar in design to a Microsoft Windows' Registry Editor that is well known in the art. FIG. 2 illustrates a view of the TelAdmin application user interface in the prior art. In FIG. 2, the TelAdmin application 190 displays a graphical representation of TelAlert's sections (for example, the Configuration and Destination sections) in a tree structure in the left pane of the main window 210. The definitions under each section (if any) are displayed in the right pane 220 when one clicks a section icon on the tree (much as the Microsoft Windows Registry Editor displays registry keys and values).

Depending on the type of keyword value, the end-user may provide a value by a pull-down list, type a string or number in a field, or set a time, date, or some other type of formatted data using spinners. The TelAdmin application relies on pull-down menus having options that are sometimes dynamically generated, based on the current state of the telalert.sects 120 file. When configuring a keyword that refers to another keyword (for example, a Port definition from a Configuration definition, or a Configuration definition from a Destination definition), the keyword referred to must already exist; otherwise, it will not appear among the options presented in the pull-down menu. However, again, the TelAdmin application has no way to ensure the existence of this configuration information prior to dynamically generating the pull-down menus.

When the TelAlert Administrator finishes making configuration changes, the administrator may click the 'Save' button to commit the changes, click 'Undo' button to undo any changes made, or click 'Cancel' button to dismiss the dialog without saving changes. However, upon saving the changes, the telalert.sects 120 file is instantly overridden and therefore no backup file is saved from which to back-out any erroneous configuration changes made.

In addition, each time the telalert.sects 120 file is edited or compiled, the transmission of alert messages are halted until the TelAlert system and telecommunication delivery mechanisms are reinitialized with the updated configuration information. Depending on the number of telecommunication delivery mechanisms, the reinitialization may take a substantial amount of time, thereby, again, delaying the delivery of an alert message to the necessary support staff. The problem may also be compounded, depending on the number of end-users updating the telalert.sects 120 file, causing a reinitialization each time the telalert.sects 120 file is updated. Thereby causing a substantial delay to the delivery and resolution of alert messages.

Furthermore, the TelAdmin application 190 may manage multiple TelAlert servers at once in a single instance of the TelAdmin application. By using the TelAdmin application 190, multiple end-users may simultaneously reconfigure the TelAlert system, and a record-locking system ensures that they do not accidentally overwrite each other's changes, by defining an Owner section and an Owner keyword within the TelAlert configuration file. However, the TelAdmin application 190 is limited to this level of granularity in its access control. Therefore, for example, department heads may use the TelAdmin application to define access rights that control which system administrators may configure which TelAlert sections and definitions.

In addition, when operating in an environment that manages multiple TelAlert systems, the TelAdmin application 190 is limited to "pushing" configuration information to the remote servers. Hence, only one remote server may be updated at any one time. This increases the amount of time to configure multiple systems.

While it is technically possible to switch from one configuration method to the other (that is, from using the TelAdmin application to editing telalert.ini 115 file, and vice-versa), care must be taken not to overwrite any of changes accidentally.

BRIEF SUMMARY OF THE INVENTION

The present invention pertains to a method and apparatus for the generation of an alert configuration file. According to one embodiment, configuration information is stored in a relational database from which a configuration generator uses to generate a text configuration file. The configuration information being stored in a relational database allows for access control and data validation. At periodic intervals, the text configuration file is compiled to reinitialize an alerts server with the updated configuration information.

Additional features and advantages of the present invention will be apparent from the accompanying drawings and from the detailed description that follows.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

A method and apparatus for generating a configuration file is described. Specifically, configuration information is accessed from a database to be modified into a particular configuration file format. In one embodiment, a relational database stores configuration information in a normalized form to be accessed by a configuration generator. The configuration generator extracts the configuration information from the relational database and generates at least one TelAlert configuration file. It should be understood that although the following describes the generation of a TelAlert configuration file to be used by a TelAlert server, the invention is not limited to only TelAlert configuration file formats. Alternatively, other types of configuration file formats for alternative alert server may also be generated within the scope of the invention.

The TelAlert System

Figure 1B:
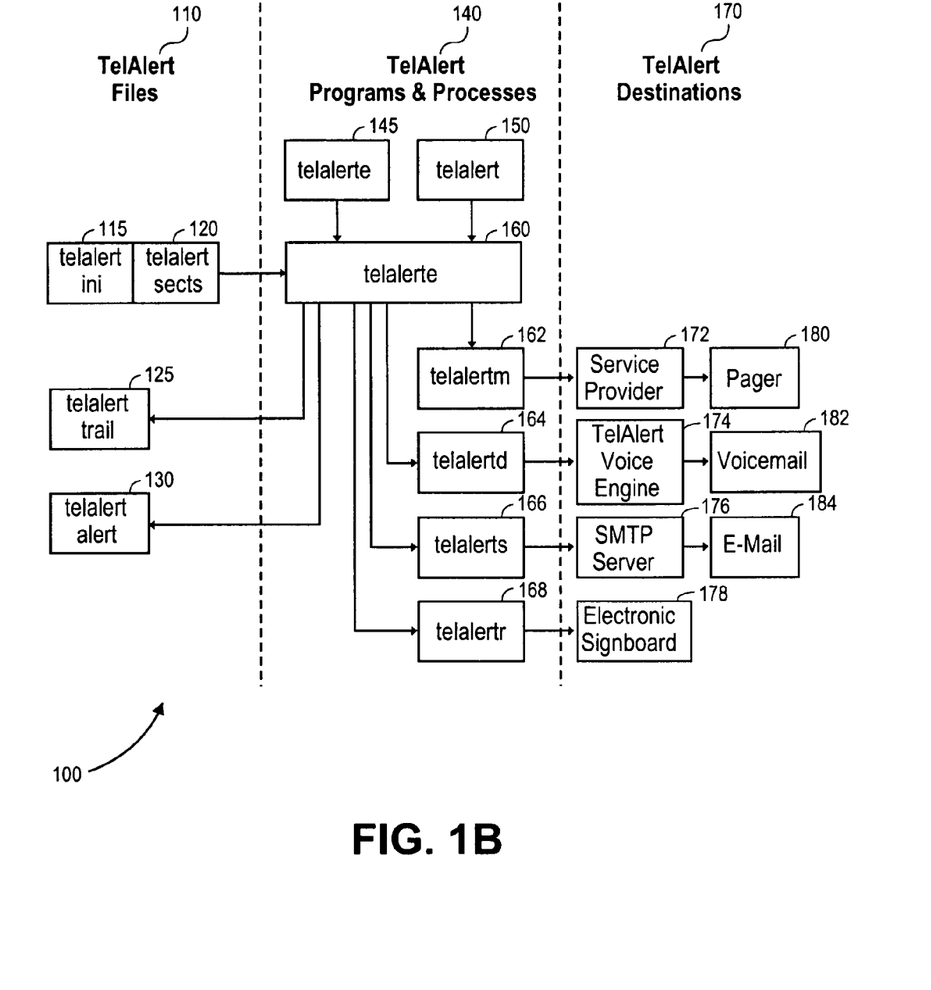
FIG. 1B illustrates a block diagram of the prior art TelAlert system architecture.

FIG. 1B illustrates a block diagram of the prior art TelAlert system architecture. Here, FIG. 1B is partitioned by TelAlert programs 140, TelAlert files 110, and TelAlert destinations 170.

Fundamentally, TelAlert programs 140 includes two command line programs (telalertc 145 and telalert 150,) and five processes (telalerte 160, telalertm 162, telalertd 164, telalerts 166, and telalertr 168). These TelAlert programs 140 interact with the TelAlert files 110 and TelAlert destinations 170. TelAlert files 110 include the telalert.ini 115 file, the telalert-.sects 120 file, the telalert.trail 125 file, and the telalert.alert 130 file. The TelAlert destinations 170 include service provider 172, TelAlert voice engine 174, SMTP server 176 (Simple Mail Transfer Protocol), and electronic signboard 178.

The telalertc 145 program is a client program used by an end-user to issue instructions to the telalerte 160 process as will be further described below. The telalertc 145 program may be executed directly by an end-user from a command line or called from within a software application by a API function call, JAVA methods, etc.

For example, to send a message to a specific text pager via the command line (e.g., from a Unix or DOS prompt), the following command may be used:

telalertc -c SkyTelNationalTextPager -pin 1234567 -m "node 2745 down"

The telalertc 145 program uses parameters to process the message delivery. This definition (e.g., the SkyTelNationalTextPager definition) contains information on how to use the SkyTel service. The PIN for the intended individual recipient is passed here on the command line, as is the message itself (the text following -m). Additional information may be passed when executing the telalertc 145 program by incorporating configuration information into a TelAlert configuration file as will be further described below.

The telalert 150 program is a command line program used to issue administrative instructions to the telalerte 115 program. For example, the telalert 150 program may be used to start, stop, and initiate a compile on the TelAlert system 100. The telalertc 145 program is actually a subset of the telalert 150 program without the capability to start, stop and initiate a compile on the TelAlert system 100.

The telalerte 160 process is, in essence, the TelAlert server. As a continually running process, telalerte 160 takes commands, parameters, and messages from the telalertc 145 or telalert 150 program and prepares the message for its eventual destination by passing complete instructions to a TelAlert process responsible for transmission via a specific telecommunication delivery mechanism. As illustrated in FIG. 1B, the telalerte 160 program passes alert messages to service provider 172, TelAlert voice engine 174, SMTP server 176, and electronic signboard 178.

The telalertm 162 process is responsible for dialing the modem of the server on which TelAlert is installed and, following instructions passed to it by the telalerte 160 program, sending and receiving information over this connection. The telalertm 162 process handles only numeric and text paging and polling. Here, the modem dials Service provider 172 to send a message to pager 180.

The telalertd 164 process is responsible for operation of the voice-enabled TelAlert Voice Engine 174. Following instructions provided by the telalerte 160 program, the telalertd 164 process controls the modem of the TelAlert Voice Engine 174 and any external devices (including sensors and relays) connected to it. The telalertd 164 process also provides the TelAlert Voice Engine 174 with the messages that it is to read. Here, the telalertd 164 process sends a message to TelAlert Voice Engine 174 to be sent to the voicemail device 182.

The telalertr 168 process is responsible for controlling electronic signboards and other RS232 devices (excluding the TelAlert Voice Engine 174 and modems). Here, a message may be sent and displayed on Electronic Signboard 178.

The telalerts 166 process is responsible for all sockets-based TelAlert interactions. It communicates to a SMTP/SNPP (Simple Network Paging Protocol) server 176 to send email and online pages, respectively. Here, the telalerts 166 process forwards the message to SMTP/SNPP server 176 to be sent to the email address of email 184.

Configuration Information

In general, in order to understand alert and response objectives, the telalerte 160 program relies on information stored in a TelAlert configuration file. While it is possible to pass varying amounts of information directly on the command line, virtually all commands use configuration keywords to make explicit reference to information stored in a configuration file. The TelAlert configuration files include the telalert.ini 115 file and the telalert.sects 120 file. The telalert.sects 120 file is the compiled version of the telalert.ini 115 file. Specifically, the telalerte 160 program reads the telalert.sects 120 file, not the telalert.ini 115 file, in order to process commands. However, as will be described, these two TelAlert configuration files are heavily dependent on one another.

The telalert.ini 115 file contains a variety of configuration information that the telalerte 160 process uses to carry out commands. Some of the configuration information is standard information which rarely changes while other configuration information may be updated often. The configuration information includes licensing details; information about ports, devices, groups, schedules, and users; and instructions about sending messages to specific destinations and general destination types as will be described further below.

In addition, the telalert.ini 115 file is divided into "sections" headed by words enclosed in "straight" [brackets]. Many (but not all) of these sections are further subdivided into "definitions" headed by words enclosed in "curly" {braces}. Each section is devoted to a certain type of configuration information. There can be multiple instances of some sections; others are limited to one. Some sections are comprised partly of definitions, where other sections are not comprised of any definitions. Sections of both kinds may contain some values that are not part of any definition.

Lines in the telalert.ini 115 file that are neither section nor definition headings take the form "keyword=value", where "keyword" is any of the many words the telalerte 160 program is programmed to recognize (including but not limited to section names), and "value" is the value assign by a TelAlert administrator (e.g., an integer value, True/False, a definition name, etc.).

The following gives a brief description of a number of sections of the telalert.ini 115 file. Specifically, the Configuration, Destination, User, Group, Schedule, and Strategy sections. The Configurations section contains entries defining basic configuration information for different telecommunication delivery mechanism (e.g., email, a specific kind of pager, an electronic signboard model, etc.). The Destinations section contains entries defining specific "destinations." For example, a Destinations definition might look something like this:

{LauraTextPager}
Configuration=SkyTelNationalTextPager
PIN=4850879

The second line of this definition refers to the entry in the Configurations section called
{SkyTelNationalTextPager}, which might look something like this:

{SkyTelNationalTextPager}
Type=TextPager
AreaCode=800
Number=6792778
Speed=19200

Within the Configuration section, definitions are used to represent the attributes of specific telecommunication deliver mechanisms. Here, the names of each telecommunications delivery mechanism must be unique within the Configuration section. Within the Destination section, definitions are used to represent destinations to which one wants to be able to send alert messages. Destination names must be unique within the Destination section.

The User section is used to represent the people to whom the TelAlert system 100 can send messages. Only one User section is allowed. Within the User section, definitions are used to represent individual users. User names must be unique within the User section. Password values must also be unique.

The Group section provides a means of grouping two or more destinations so messages can be sent to several individuals with a single command. Within the Group section, definitions are used to represent groups of destinations. Group names must be unique within the Group section. Sending a message to a group means sending it to all of the destinations comprising that group, either all at once or one at a time, according to specified rules.

Group definitions defined in the group section are critical to TelAlert's escalation capability. Only by setting up a Group definition and invoking it in a command can one ensure that a message reaches someone who can handle the problem, even if the initial send fails or goes unacknowledged. In addition, one Group definition may be referred to within another simply by listing its name as one of the values in the Destination=line.

The Schedule section is used to define on-duty schedules that can be associated with User, Destination, and Group definitions. Within the Schedule section, definitions are used to represent schedules. Schedule names must be unique within the Schedule section. The order of the definitions within the section is significant when Schedule or AddSchedules is used in one Schedule definition to refer to another. Specifically, the referred-to definition must precede the referring definition.

The Strategy section contains definitions that can be invoked to determine when a send directed to a group is considered complete and when the alert should be escalated from one subgroup to the next. Entries under Strategy section are relevant for a message sent to a group and are referred to in the Group definitions. They determine two things: (1) how TelAlert recognizes an alert as complete and (2) under what conditions it escalates the alert by sending to a subsequent destination. Only one Strategy section is allowed. Within the Strategy section, definitions are used to represent escalation strategies. Strategy names must be unique within the Strategy section.

The telalert.ini 115 file can also contain references to outside resources, including scripts and text files storing additional definitions. Here, the contents of text files may be including by inserting $include in key locations and pointing to the desired file. At compile-time, the telalert.sects 120 file (the binary file from which the telalerte 160 process draws the information it needs to process alert message) is created out of the telalert.ini 115 and any files included by this means. For example, the following may be included under the Users section of a telalert.ini 115 file:

$include /telalert/users.txt

Here, the users.txt contains the user definitions (e.g. name, password, schedule, etc.) of the people to whom the TelAlert system 100 can send messages. At compile-time, the telalerte 160 process will extract the user definitions from the users.txt file to determine who can receive alert messages.

In addition, if $include keywords are used within a telalert.ini 115 file that is later used by the TelAdmin application 190, then switching back to a later exported telalert.ini 115 file from the TelAdmin application 190 will cause each $include statement to be replaced with the full text of the referenced file.

TelAlert Output Files

Upon providing the necessary configuration information and executing the telalertc 145 program, the telalert.alert and telalert.trail 125 files are created. For example, if a controlling application issues the following command: telalertc -i Bob-TextPager -m "node 2745 down". This command invokes the telalertc 145 program, which passes the command to the telalerte 160 program. The telalerte 160 program then accesses in the telalert.sects 120 file, the compiled version of the telalert.ini 115 file, to find the necessary configuration information such as, the definition for the recipient, the configuration information for the modem to be used, among other examples.

Next, the telalerte 160 program tells the telalertm 172 process precisely what to do, providing it with instructions for dialing the specified service provider, the PIN for this particular recipient, and finally the message itself.

All the while, the telalerte 160 program records each step in the process into the telalert.trail 125 file. It also records the alert as active in the telalert.alert 130 file. Similarly, if someone uses telalert to request a list of all active alerts, it is the telalerte 160 process that retrieves this information and passes it to the TelAlert system 100 for display.

Configuration Generator

Figure 3:
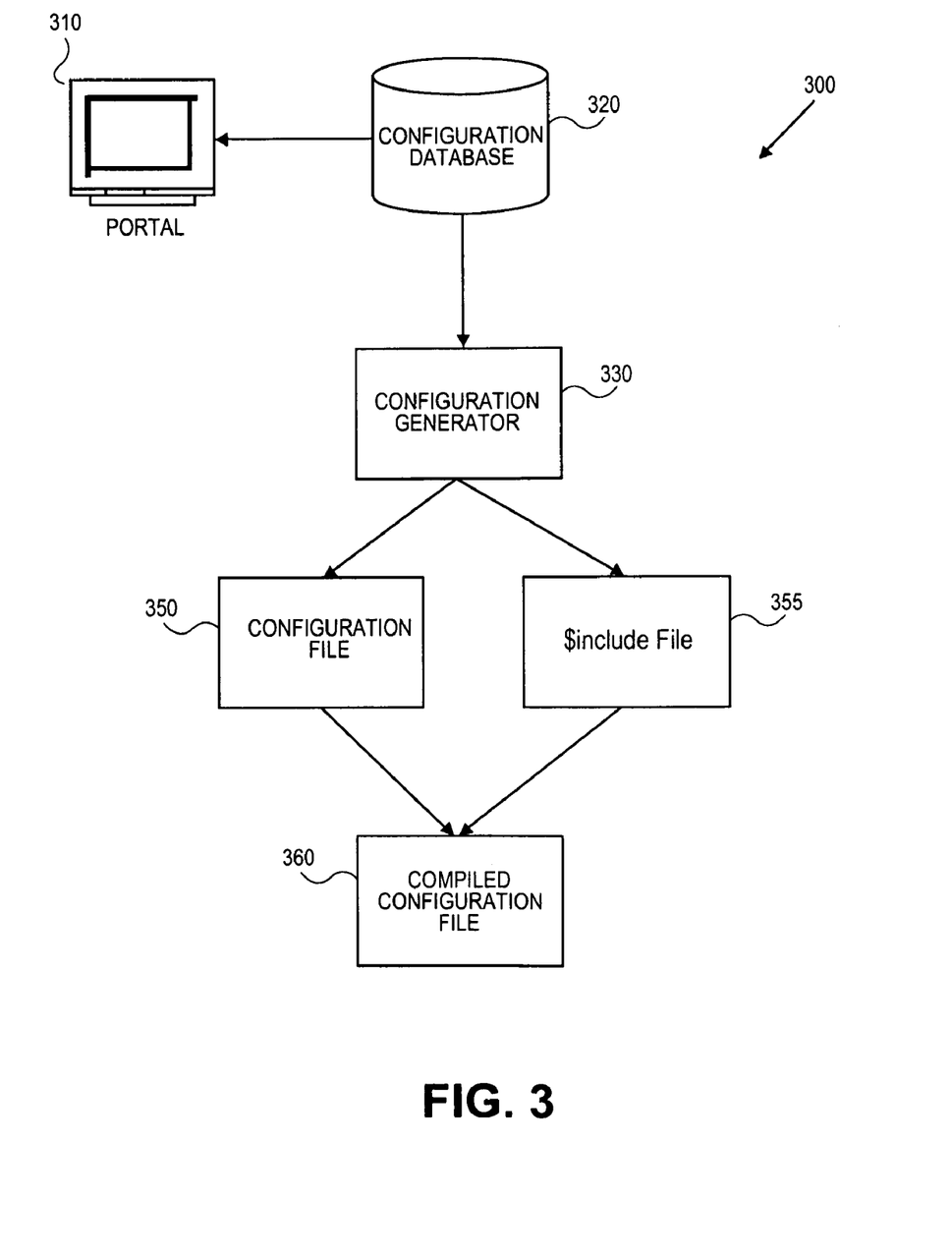
FIG. 3 illustrates a block diagram of an alert management system according to one embodiment.

FIG. 3 illustrates a block diagram of an alert management system according to one embodiment. The alert management system 300 comprises a portal 310, a configuration database 320, a configuration generator 330, configuration file 350, and compiled configuration file 360. In one embodiment, the configuration database 320 contains configuration information used by the TelAlert system 100 to provide alert messages to specific contact individuals and groups.

Figure 4:
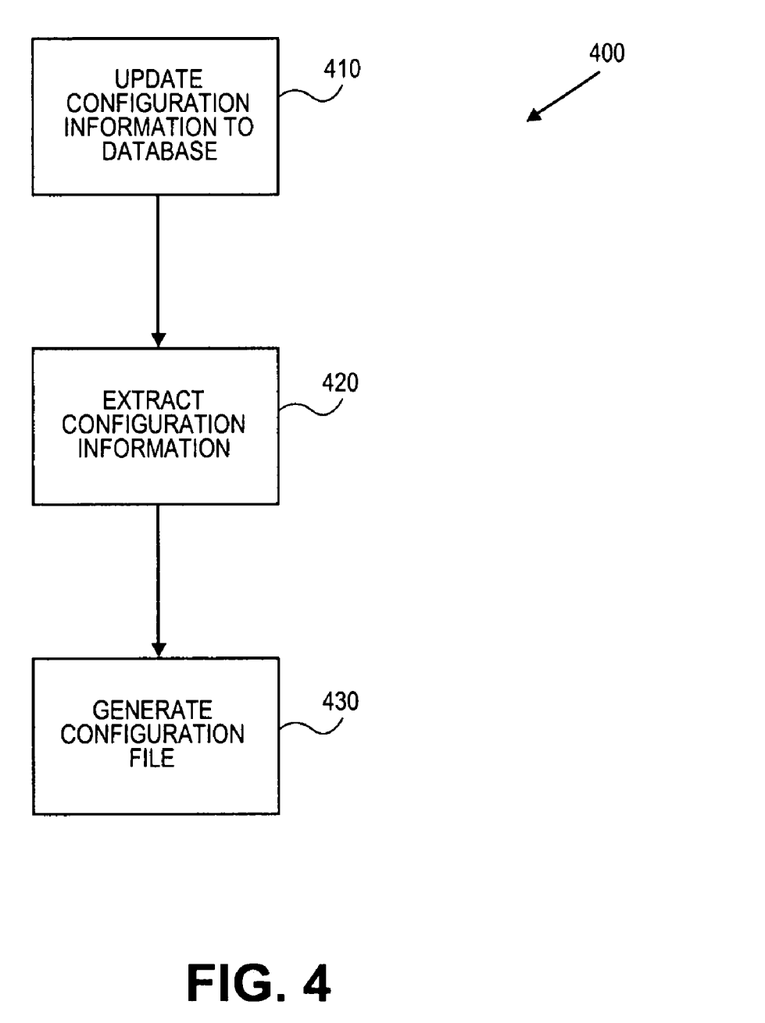
FIG. 4 illustrates a flow diagram according to one embodiment of the alert management system.

FIG. 4 illustrates a flow diagram according to one embodiment of the alert management system. The following example illustrates the manner in which a TelAlert configuration file is generated by the alert management system 300 with reference to FIGS. 3 and 4, according to one embodiment.

At block 410, an end-user uses a portal 310 to provide configuration information to and update configuration information stored in the configuration database 320. The portal 310 provides a user interface by which an end-user may access the updated configuration information. In one embodiment, the portal 310 is a web-based client that provides a user interface having forms through which the end-user provides configuration information. A common gateway interface (CGI) program may process the configuration information between the portal 310 and the configuration database 320 over a secured connections pathway.

Figure 5:
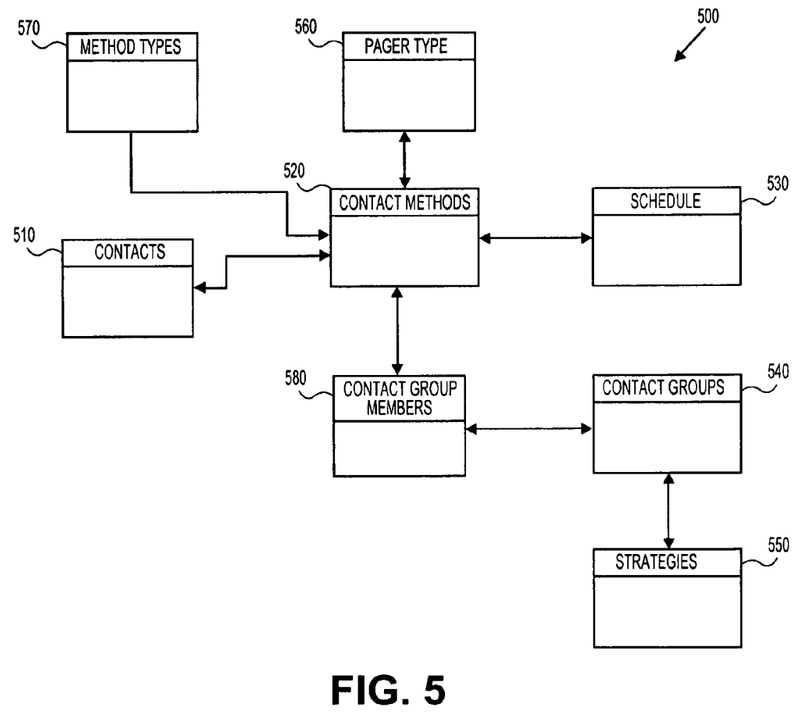
FIG. 5 illustrates one embodiment of a logical configuration data model.

In one embodiment, the configuration information is stored logically in a relational database. FIG. 5 illustrates a logical configuration data model according to one embodiment. Here, the configuration data model 500 illustrates the configuration information logically stored in multiple schema (e.g., a schema defines database tables, the field names of each table, and their relationships). These schema include contacts table 510, contact method table 520, schedule table 530, contact group table 540, strategy table 550, pager types table 560, method type table 570, and a contact group members table 580. It should be understood that the schema illustrated in FIG. 5 are by way of example and in alternative embodiments additional schema may be defined as required to provide any necessary alert messages.

The contacts table 510 stores user information to be provided to the users section of a telalert.ini 115 file. Each contact in contacts table 510 may be associated with one or more contact methods in the contact method table 520. A contact method defines how a contact is to be notified when an alert message is sent. The contact method contains configuration information similar to configuration information stored in the configuration and destination sections of the telalert.ini 115 file. The method type table 510 defines the various telecommunication delivery mechanisms (e.g., phones, email, etc.) that may be associated to a specific contact.

The schema for the schedule table 530, contact group table 540, strategy table 550, and pager types table 560 each contain configuration information as described above for the schedule, group, strategy, and configuration sections within a telalert.ini 115 file, respectively. The contact group members table 580 contains associations between the contact methods stored in the contact methods table 520 and the contact group defined in the contact groups table 540.

By way of example, a new employee is added to the contacts table 510 and assigned a contact method within contact table 520, such as, to be notified by an email alert message, where the method type 570 is 'email address'. In addition, the contact is assigned to a contact group 540, such as, Group A, which has its available work hours defined in the schedule table 530, such as "Weekdays 9 am-5 pm." Thereby, each group may be associated with specific contact methods within the contact group table 580.

Storing the configuration information in this manner allows for more administrative control and validation. In one embodiment, database stored procedures, triggers, and table attributes that are well know in the art, may be used to provide validation to the insertion, modification, and deletion of new configuration information to the configuration database 320. Therefore, in this way database protocols are used to provide referential checks, value validation checks, typographical error checks, and TelAlert system checks automatically. For example, in this way, a section may be defined to be unique within a table, an administrator may determine which contact methods 540 belong to which contact, or provide a stored procedure that will prevent a contact method from existing without first creating a contact, among other examples. Neither configuration method as described in the prior art allows for such administrative, access, and validation control.

At block 420, a configuration generator 330 extracts the necessary configuration information from the configuration database 320. The extraction of configuration information may include extracting all of the configuration information from the configuration database 320 or extracting only a subset of the configuration information from the configuration database 320. In one embodiment, the configuration database 320 may contain configuration information for multiple TelAlert systems 100, on multiple servers, in multiple networking environments. In this case, the configuration generator 330, only extracts the configuration information associated to a specific TelAlert system 100.

For example, the configuration database 320 may contain configuration information for both business sites A and B. Here, end-users of business site A update only the configuration information for business site A. In addition, end-users of business site B update only the configuration information for business site B. When the configuration generator is executed, it is given an indication as to what business sites to extract configuration information for (e.g., a parameter indicating the extraction of business site A configuration information). The configuration generator will then extract the configuration information for this specific business site only. This allows a TelAlert administrator to manage multiple Telalert systems across multiple local area or wide area networks from one configuration database. This differs from the prior art TelAdmin application that may only allow end-user access to those end-users on a local area network.

In an alternative embodiment, the configuration generator on a remote server makes a request to the configuration database over a communications pathway for specific configuration information that is required for that specific site. In this way, a TelAlert administrator may provide the same configuration information to multiple remote sites. This may be beneficial for a TelAlert system that acts as a failsafe or backup server, and also in an environment where load distribution requires the same configuration information on multiple TelAlert system instances. For example, a business site may distribute alert messages between two separate TelAlert servers that are updated with the same configuration information. Here, the configuration information may be stored in the single configuration database, where in the prior art, the TelAdmin application 190 would require editing the two separate instances of TelAlert on the two remote sites.

At block 430, a configuration generator 330 creates a configuration file 350 from the extracted configuration information. In one embodiment, the configuration generator 330 creates a telalert.ini 115 file by generating and formatting the extracted configuration information within an ASCII text file. The formatting may include standard information that is in all telalert.ini 115 file(s) and the configuration information that is dependent on the information extracted from the configuration database 320. The flow of the generation process may comprise creating a user section heading within straight braces followed by the result set of a query for contact configuration information. This is followed by creating a group section heading within straight braces followed by the result set of a query for group configuration information. This process will continue section by section until the telalert.ini 115 file is complete.

In one embodiment, the configuration generator 330 extracts configuration information into a TelAlert configuration $include file 355. As stated above, the TelAlert configuration $include file 355 is referenced by the telalerte 160 program when compiling the telalert.ini 115 file. Here, for example, a different $include file may be referenced and generated for each section within the telalert.ini 115 file. These $include files 355 are then incorporated by the telalerte 160 program when the telalert.ini 115 file is compiled.

In one embodiment, the generation of a compiled configuration file 360 is performed in two stages. First, the configuration generator generates the telalert.ini 115 file and $include file 355 into a testing location. The testing location is where the Telalert system 100 confirms that the telalert.ini 115 file is configured correctly. If the telalert.ini 115 file and $include file(s) 355 are configured correctly (e.g., the telalert.ini file compiled successfully), then the compiled telalert.sects 120 file is moved to a production location where this telalert.sects 120 file will be reinitialized. When moving the new configuration files into the production location, the old copies of the configuration files are saved in case the new configuration files are in some way corrupt or incorrect. In this way, an administrator may back-out of any changes made by re-compiling the old configuration files.

In one embodiment, after the telalert.ini 115 file and any associated $include file(s) are generated by the configuration generator 330, these files are scheduled to be compiled into a telalert.sects 120 file at periodic intervals or a specific time. In one embodiment, well known scheduling tools (e.g., Unix cron application, Microsoft Windows NT Scheduler application, etc.) are used to schedule the automatic compilation of the telalert.ini 115 file. Scheduling the time to generate and compile the telalert.ini 115 file allows for a variation of the frequency in which the TelAlert server is initialized with updated configuration information. For example, the scheduler may be set to generate and compile an updated telalert.ini 115 file every half hour. As stated above, each time the telalert.ini 115 file is compiled, the TelAlert server is reinitialized with the updated configuration, thereby causing the TelAlert server to halt the transmits of all alert messages until the reinitialization is complete. Scheduling when the configuration file is to be generated and compiled, lessens interruptions to the alert management system 300, thereby allowing more alerts to be processed without delays.

It should be appreciated that the invention provides for an efficient manner to update configuration information to a TelAlert system. Using a database allows for validation, access, and administrative control beyond the configuration methods of the prior art. The file level checking provides additional validation and a backup copy of the configuration files in the unexpected case an error is discovered when the telalert.ini 115 file is compiled to a telalert.sects 120 file. In addition, the scheduling of the compilation of the telalert.ini 115 file prevents the TelAlert server from frequently being halted when applying updated configuration information. In this manner, updates of the configuration information is applied with fewer errors, thereby increasing the throughput of alert messages to the necessary support staff.

Figure 6:
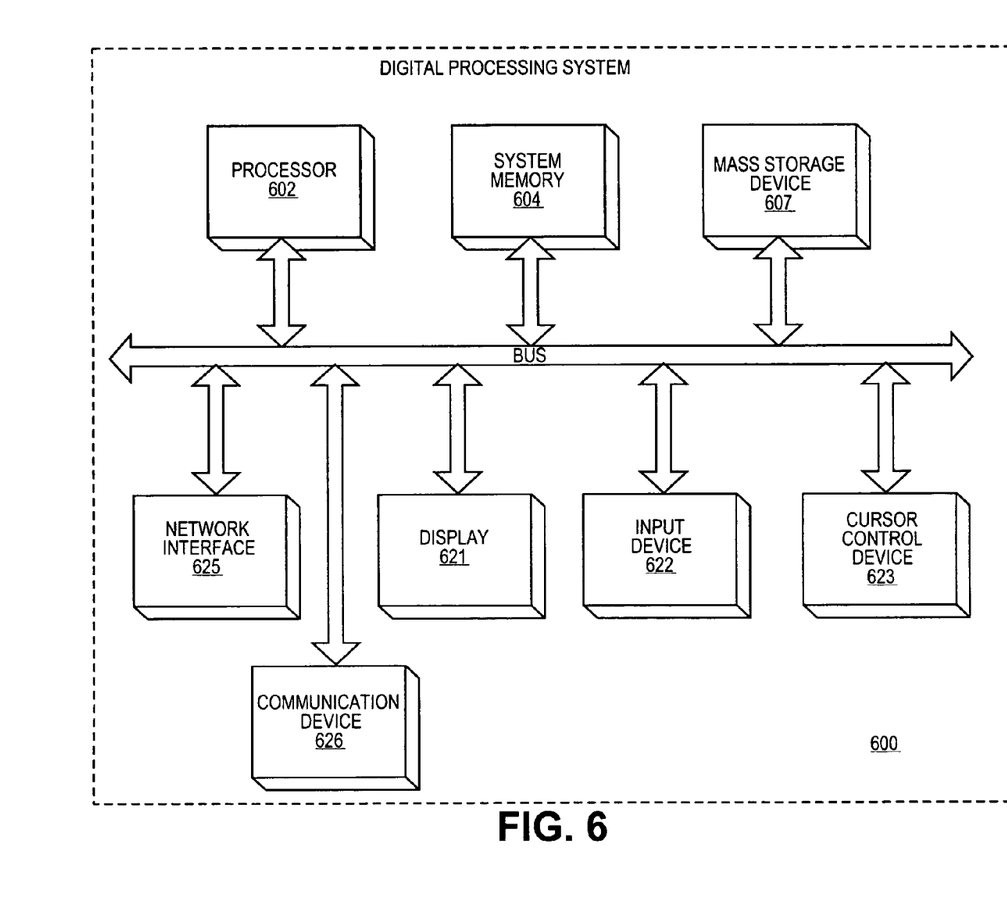
FIG. 6 illustrates one embodiment of a configuration generator in the form of digital processing system.

FIG. 6 illustrates one embodiment of a configuration generator in the form of digital processing system 600 representing an exemplary workstation, personal computer, server, etc., in which features of the present invention may be implemented.

Digital processing system 600 includes a bus or other communication means 601 for communicating information, and a processing means such as processor 602 coupled with bus 601 for processing information. Hereinafter, the term coupled may mean either coupled directly or indirectly through one or more components. Digital processing system 600 further includes system memory 604 that may include a random access memory (RAM), or other dynamic storage device, coupled to bus 601 for storing information and instructions to be executed by processor 602. System memory 604 also may be used for storing temporary variables or other intermediate information during execution of instructions by processor 602. System memory 604 may also include a read only memory (ROM) and/or other static storage device coupled to bus 601 for storing static information and instructions for processor 602.

A mass storage device 607 such as a magnetic disk or optical disc and its corresponding drive may also be coupled to digital processing system 600 for storing information and instructions. The data storage device 607 may be a database, such as, a relational database. The data storage device 607 may be used to store instructions for performing the steps discussed herein. Processor 602 may be configured to execute the instructions for performing the steps discussed herein. In one embodiment, digital processing system 600 is configured to operate with a LINUX operating system stored on data storage device 607. In alternative embodiments, another operating system may be used, for examples, UNIX, Windows NT, and Solaris.

In one embodiment, digital processing system 600 may also be coupled via bus 601 to a display device 621, such as a cathode ray tube (CRT) or Liquid Crystal Display (LCD), for displaying information to system administrator. For example, graphical and/or textual depictions/indications of system performance characteristics, and other data types and information may be presented to the system administrator on the display device 621. Typically, an alphanumeric input device 622, including alphanumeric and other keys, may be coupled to bus 601 for communicating information and/or command selections to processor 602. Another type of user input device is cursor control 623, such as a mouse, a trackball, or cursor direction keys for communicating direction information and command selections to processor 602 and for controlling cursor movement on display 621.

A network interface device 625 is also coupled to bus 601. Depending upon the particular design environment implementation, the network interface device 625 may be an Ethernet card, token ring card, or other types of physical attachment for purposes of providing a communication link to support a local area network, for example, for which digital processing system 600 is monitoring. In any event, in this manner, digital processing system 600 may be coupled to a number of clients and/or servers via a conventional network infrastructure, such as a company's Intranet and/or the Internet, for example.

It will be appreciated that the digital processing system 600 represents only one example of a system, which may have many different configurations and architectures, and which may be employed with the present invention. For example, some systems often have multiple buses, such as a peripheral bus, a dedicated cache bus, etc.

Unless specifically stated otherwise, as apparent from the discussion, it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices.

The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, CD roms and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIG. 3, 4, or 5 may be suitable for implementation as logic blocks, as may other configurations of the method, system and apparatus described herein.

The methods and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc.) as taken in action or causing a result. Such expressions are merely a shorthand way of saying that execution of the software by a computer causes the processor of the computer to perform an action or produce a result.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer-implemented method comprising:
   validating configuration information specified by at least one user for a plurality of business sites, the configuration information pertaining to alert messages to be sent to a plurality of destinations via a plurality of notification methods, the configuration information defining groups of destinations from the plurality of destinations to facilitate transmission of alert messages to destinations in a group via a single command;

storing the validated configuration information concerning the plurality of business sites in a database, wherein the database associates each of the plurality of destinations with one or more of the plurality of notification methods, and further associates each destination group with one or more of the plurality of the notification methods;

extracting at least a subset of the configuration information from the database based on an extraction parameter identifying one of the plurality of business sites; and generating a text-based configuration file containing the extracted configuration information for the one of the plurality of business sites.

2. The method of claim 1 wherein the configuration information includes configuration keyword information recognizable by a messaging application.

3. The method of claim 1 wherein the database is a relational database.

4. The method of claim 1 further comprising:
configuring a messaging application using the configuration file.

5. The method of claim 1 further comprising periodically generating additional text-based configuration files according to a schedule.

6. The method of claim 1 wherein the database includes configuration information for the plurality of business sites across a plurality of networks.

7. The method of claim 1 wherein the configuration information is used by at least one messaging application to transmit the alert messages to the plurality of destinations.

8. The method of claim 1 wherein the configuration information includes a contact.

9. The method of claim 1 wherein the configuration information includes a contact notification method.

10. The method of claim 1 wherein the configuration information includes a method type.

11. The method of claim 1 wherein the configuration information includes a contact group.

12. The method of claim 1 wherein the configuration information includes a contact group member.

13. The method of claim 1 wherein the configuration information includes a schedule.

14. The method of claim 1 wherein the configuration information includes a strategy.

15. The method of claim 1 wherein the configuration information includes a pager type.

16. The method of claim 1 further comprising: creating at least one include file for a plurality of sections within the configuration file.

17. The method of claim 1 further comprising:
compiling the configuration file into a compiled file at a later time.

18. The method of claim 1 further comprising:
updating the configuration information stored in the database through a portal.

19. The method of claim 1 wherein the extracting is performed over a secure communication pathway.

20. The method of claim 1 wherein validating configuration information comprises:
performing at least one of a referential check, a value validation check and a typographical error check.

21. A machine-readable medium that provides instructions, which when executed by a processor, cause said processor to perform a method comprising:
validating configuration information specified by at least one user for a plurality of business sites, the configuration information pertaining to alert messages to be sent to a plurality of destinations via a plurality of notification methods, the configuration information defining groups of destinations from the plurality of destinations to facilitate transmission of alert messages to destinations in a group via a single command;

storing the validated configuration information concerning the plurality of business sites in a database, wherein the database associates each of the plurality of destinations with one or more of the plurality of notification methods, and further associates each destination group with one or more of the plurality of the notification methods;

extracting at least a subset of the configuration information from the database based on an extraction parameter identifying one of the plurality of business sites; and generating a text-based configuration file containing the extracted configuration information for the one of the plurality of business sites.

22. The machine-readable medium of claim 21, wherein the configuration information includes configuration keyword information recognizable by a messaging application.

23. The machine-readable medium of claim 21, wherein the database is a relational database.

24. The machine-readable medium of claim 21, wherein the method further comprises configuring a messaging application using the configuration file.

25. The machine-readable medium of claim 21, wherein the generating of the text-based configuration file is performed periodically according to a schedule.

26. The machine-readable medium of claim 21, wherein the database includes configuration information for the plurality of business sites across a plurality of networks.

27. The machine-readable medium of claim 21, wherein the configuration information is used by at least one messaging application to transmit the alert messages to the plurality of destinations.

28. The machine-readable medium of claim 21, wherein the configuration information includes a set of one or more contacts, contact notification methods, method types, contact groups, contact group members, schedules, strategies, and pager type.

29. The machine-readable medium of claim 21, wherein the method further comprises: creating at least one include file for a plurality of sections within the configuration file.

30. The machine-readable medium of claim 21, wherein the method further comprises:
compiling the configuration file into a compiled file at a later time.

31. The machine-readable medium of claim 21, wherein the method further comprises:
updating the configuration information stored in the database through a portal.

32. The machine-readable medium of claim 21, wherein the receiving is performed over a secure communication pathway.

33. An apparatus comprising:
a database to store configuration information pertaining to alert messages to be sent to a plurality of destinations via a plurality of notification methods, the configuration information being specified by at least one user for a plurality of business sites, the configuration information defining groups of destinations from the plurality of destinations to facilitate transmission of alert messages to destinations in a group via a single command, the database associating each of the plurality of destinations with one or more of the plurality of notification methods, and further associating each destination group with one or more of the plurality of the notification methods; and a configuration generator to validate the configuration information to be saved in the database, to extract at least a subset of the configuration information over a communication pathway from the database based on an extraction parameter identifying one of the plurality of business sites, and to generate at least one text-based configuration file including the extracted configuration information for the one of the plurality of business sites.

34. The apparatus of claim 33, further comprising:
a portal to provide access to a user to update the configuration information.

35. The apparatus of claim 33, wherein the configuration information includes configuration keyword information recognizable by a messaging application.

36. The apparatus of claim 33, wherein the configuration information includes a set of one or more contacts, contact notification methods, method types, contact groups, contact group members, schedules, strategies, and pager type.

37. The apparatus of claim 33, wherein the database is a relational database.

38. The apparatus of claim 33, further comprising:
a compiler to generate a binary configuration file after generation of the configuration file.

39. The apparatus of claim 38, wherein the generation of the binary configuration file is executed from a scheduling tool.

40. The apparatus of claim 39, wherein the scheduling tool is at least one from a group consisting of a windows scheduler or a unix cron.

41. The apparatus of claim 33, wherein the configuration generator is further to generate at least one include file for a plurality of sections within the configuration file.

42. The apparatus of claim 33, wherein the communication pathway is a secure communication pathway.

43. An apparatus comprising:
a storage device having a database to store configuration information pertaining to alert messages to be sent to a plurality of destinations via a plurality of notification methods, the configuration information being specified by at least one user for a plurality of business sites, the configuration information defining groups of destinations from the plurality of destinations to facilitate transmission of alert messages to destinations in a group via a single command, the database associating each of the plurality of destinations with one or more of the plurality of notification methods, and further associating each destination group with one or more of the plurality of the notification methods; and
a processor coupled with the storage device over a communications pathway, the processor to validate the configuration information to be saved in the database, to extract at least a subset of the configuration information from the database based on an extraction parameter identifying one of the plurality of business sites, and to generate at least one text-based configuration file including the extracted configuration information for the one of the plurality of business sites.

44. The apparatus of claim 43, wherein the configuration information includes configuration keyword information recognizable by a messaging application.

45. The apparatus of claim 43, wherein the configuration information includes a set of one or more contacts, contact notification methods, contact groups, schedules, strategies, and pager type.

46. The apparatus of claim 43, wherein the storage device is a relational database.

47. The apparatus of claim 43, further comprising:
a compiler to generate a binary configuration file after generation of the configuration file.

48. The apparatus of claim 47, wherein the generation of the binary configuration file is executed from a scheduling tool.

49. The apparatus of claim 48, wherein the scheduling tool is one from a group consisting of a windows scheduler or a unix cron.

50. The apparatus of claim 43, wherein the processor is further to generate at least one include file for a plurality of sections within the configuration file.

51. The apparatus of claim 43, wherein the communication pathway is a secure communications pathway.

* * * * *